United States Patent

[11] 3,581,573

| [72] | Inventors | John E. Purcell |
| | | Greenwich; |
| | | Kenneth Billeb, Norwalk, both of, Conn. |
| [21] | Appl. No. | 693,926 |
| [22] | Filed | Dec. 27, 1967 |
| [45] | Patented | June 1, 1971 |
| [73] | Assignee | The Perkin-Elmer Corporation |
| | | Norwalk, Conn. |

[54] SAMPLE INJECTION ARRANGEMENT FOR AN ANALYTICAL INSTRUMENT
8 Claims, 5 Drawing Figs.

[52] U.S. Cl. .................................................. 73/422, 73/23.1
[51] Int. Cl. .................................................... G01n 31/08
[50] Field of Search .......................................... 73/23, 23.1, 25—27, 422 GL; 161/189, 206

[56] References Cited
UNITED STATES PATENTS

| 2,868,575 | 1/1959 | Hawxhurst .................. | 288/16 |
| 2,898,631 | 8/1959 | Jeffery ........................ | 18/47.5 |
| 2,947,325 | 8/1960 | McFarland ................... | 161/189X |
| 3,374,660 | 3/1968 | McKinney .................... | 73/422 |
| 3,431,783 | 3/1969 | Radgens ...................... | 73/23.1X |

FOREIGN PATENTS

| 1,025,510 | 4/1966 | Great Britain ............... | 73/23.1 |
| 739,180 | 7/1966 | Canada ........................ | 73/23.1 |

Primary Examiner—Richard C. Queisser
Assistant Examiner—C. E. Snee, III
Attorney—Edward R. Hyde, Jr.

ABSTRACT: A wall segment for an injector chamber in an analytical instrument includes a probe-penetrable, self-sealing septum body adapted for providing passage therethrough of a sample probe. A shielding, probe-penetrable body, formed of a material which is inert at the operating temperature, is positioned between an interior surface of the septum body and the chamber environment for shielding the septum body from the chamber environment. With this arrangement, the introduction of contaminating substances from the septum body into the chamber and retention of portions of the sample thereby is substantially reduced.

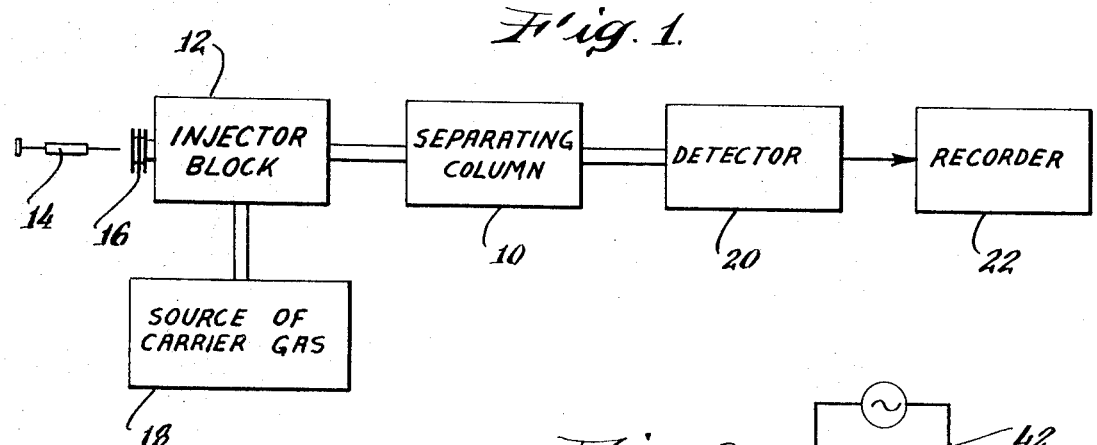
Fig. 1.
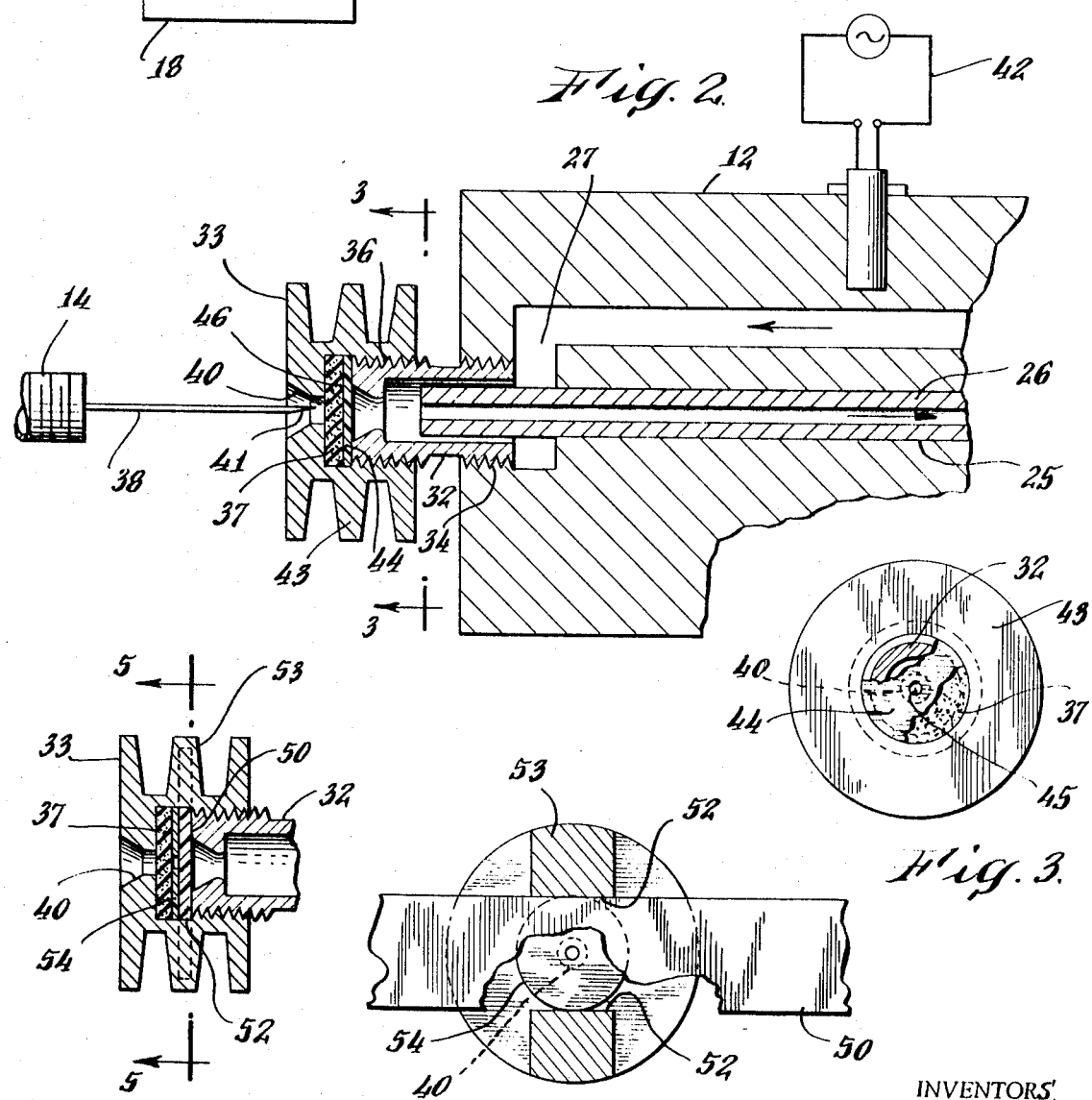
Fig. 2.
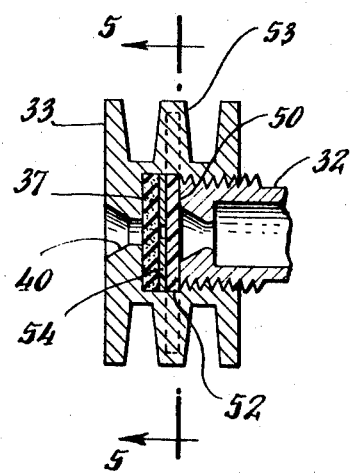
Fig. 4.
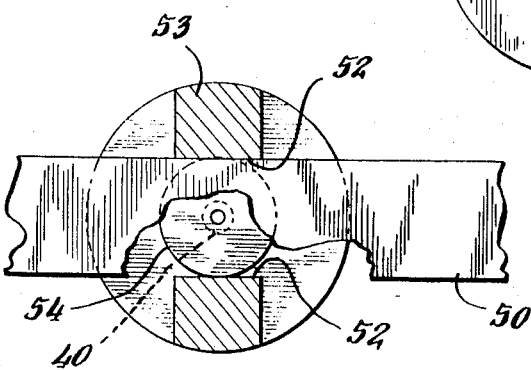
Fig. 5.
Fig. 3.
INVENTORS.
John E. Purcell
BY Kenneth Billeh
ATTORNEY.

SAMPLE INJECTION ARRANGEMENT FOR AN ANALYTICAL INSTRUMENT

This invention relates to analytical instruments. The invention relates more particularly to means for introducing a sample under analysis to an analytical instrument.

In various analytical instruments a liquid or gaseous sample under analysis is introduced to the instrument by injection of a small quantity of the sample into a flowing carrier fluid stream at a heated injector block. A liquid sample is thereby vaporized and the vaporized liquid sample or gaseous sample is conveyed by the carrier fluid to an analytical section of the instrument. In one injection arrangement, a sample entry facility is provided by a septum body which defines a wall segment of the carrier fluid flow path. The septum is formed of a penetrable, self-sealing material. A sample probe is extended through the septum into the fluid stream and the sample is then deposited in the stream. The probe generally comprises the needle of a hypodermic syringe while the septum is formed of silicone rubber.

Present-day analytical instruments exhibit a relatively high sensitivity and are adapted for temperature-programmed operation over a relatively large temperature range. The relatively high injector block temperatures required for use with correspondingly relatively high temperatures in an analyzer section have caused a phenomenon referred to as "septum bleed" whereby the septum material exhausts volatile components which contaminate the sample under analysis and generate ghost peaks. Although minute amounts of contaminants are exhausted, they are detected by relatively sensitive present-day instruments and interfere with the analysis.

In a related sample-injection problem, septum materials have demonstrated a retention characteristic whereby a portion of the sample is undesirably absorbed and retained at an inner wall surface of the septum body.

Accordingly, it is an object of this invention to provide an improved arrangement for introducing a sample under analysis to an analytical instrument.

Another object of the invention is to provide an improved injection arrangement for introducing a sample to the instrument through a self-sealing wall material.

Another object of the invention is to provide a self-sealing probe injection arrangement adapted for reducing the introduction of contaminating substances from the self-sealing material into a carrier gas stream.

A further object of the invention is to provide a self-sealing sample injection arrangement adapted for inhibiting retention of sample portions.

In accordance with the present invention, a wall segment for an injector chamber in an analytical instrument includes a probe-penetrable, self-sealing septum body adapted for providing passage therethrough of a sample probe. A shielding, probe-penetrable body, formed of a material which is inert at the operating temperature, is positioned between an interior surface of the septum body and the chamber environment for shielding the septum body from the chamber environment. With this arrangement, the introduction of contaminating substances from the septum body into the chamber and retention of portions of the sample thereby is substantially reduced.

The penetration of the probe through the shielding body forms an aperture therein. Upon removal of the probe, a relatively small area of the septum becomes exposed to the chamber environment. In accordance with another feature of this invention, means are provided for replacing the apertured, inert, shielding body while maintaining a gastight seal at the injection station. The shielding body is formed as an elongated strip and support means are adapted for advancing the strip parallel to the inner surface of the septum body. The shielding body is advanced during the analysis after withdrawal of the probe. Relatively complete shielding of the septum body is thereby established and "septum bleed" into the analyzer is effectively eliminated.

These and other objects and features of the invention will become apparent with reference to the following specifications and drawings wherein:

FIG. 1 is a block diagram of a gas chromatograph illustrating an injector arrangement incorporating features of the present invention;

FIG. 2 is a detailed side view in section of a part of the injector arrangement of FIG. 1 illustrating one embodiment of the present invention;

FIG. 3 is a view, partly broken away, of an injector cap of FIG. 2 taken along line 3–3;

FIG. 4 is a side view in section of an injector cap incorporating an alternative embodiment of the present invention; and, FIG. 5 is a view taken along lines 5–5 of the injector cap of FIG. 4.

Referring now to FIG. 1, an analytical instrument is shown to comprise a gas chromatograph having a separating column 10, an injector block 12 for introduction to the instrument of a liquid or gaseous sample material by a syringe 14 at an injector station 16, a source of carrier gas 18 for conveying the sample from the injector block to the separating column 10, and a detector 20 and a recorder 22 for respectively detecting and providing a recorded indication of the separated components of the sample which elute successively in time from the column 10.

The injector station 16 of the injector block 12 is shown in greater detail in FIG. 2. The injector block 12 comprises a metal body having an internal channel 24 and an internal channel 25 having a metal tubular insert 26 positioned therein. These channels form an elongated internal injector chamber, identified generally as 27, through which the carrier gas flows from the source 18 to the column 10. The direction of carrier gas flow is indicated by the arrowheads in FIG. 2. The chamber is further defined by a tubular metal fitting 32. This fitting which supports an annular cap 33 spaced away from the wall of the block 12 is threaded at opposite ends thereof and provides a gastight seal at an internally threaded portion 34 of the block 12 and a gastight seal at an internally threaded portion 36 of the cap 33.

A wall segment of the injector chamber 27 is formed by a cylindrical septum body 37 formed of a probe-penetrable, self-sealing material. One well known material is silicone rubber. The body 37 is supported in a cylindrical cavity of the annular cap 33. A probe 38 comprising a needle of the hypodermic syringe 14 introduces a sample into the injector chamber through a tapered entrance aperture 40 which extends axially from an outer surface of the cap to the septum body 37. The probe 38 has a length sufficient for extension axially of an exhaust tip 41 thereof through the aperture 40 and the self-sealing septum body 37 into the insert 26. Operation of the syringe 14 deposits the sample downstream and the carrier gas carries the sample to the column 10.

The separating column 10 is operated in a temperature-programmed manner over an interval of time and in order to provide vaporization of a liquid sample and to avoid subsequent condensation thereof, heater means 42 are provided for heating and operating the block 12 at temperatures at least equivalent to the highest programmed temperature of the column 10. The relatively high temperatures at which the block 12 operates exerts an adverse effect on the self-sealing septum body 37. At these high temperatures, the body exhibits a tendency to exhaust components thereof into the injector chamber 27. These components are then carried by the carrier gas stream into the analyzer section of the instrument. The effect is reduced somewhat by the use of cooling fins 43 formed on the cap 33. Nonetheless, minute quantities of contaminants are exhausted and these contaminants are detected by the instrument and interfere with proper analysis.

In accordance with a feature of this invention, a shielding body 44 formed as a circular disc of a probe-penetrable, substantially inert material is disposed between an inner surface 46 of the self-sealing septum body 37 and the environment of the injector chamber in a manner for shielding the inner surface 46 from this environment. A suitable material from which body 44 is formed is -inch thick -inch-thick Teflon. The septum body and shielding body are secured in position by rotating the cap 30 until one end of the fitting 32 bears firmly against the shielding body. Contaminants which might be exhausted are trapped at an interface of surface 46 and the body 44. In operation, the probe 38 is extended into the insert 26 by piercing the shielding body 44. The sample is then injected and the probe withdrawn. Although such piercing forms a permanent aperture 45 (FIG. 3) in the body 44, this aperture has a diameter on the order of 0.020 inch and a substantially large portion of the surface 46 is shielded from the environment of the injector block. The effect of "septum bleed" is thereby substantially reduced.

An alternative embodiment of the invention is illustrated in FIGS. 4 and 5. In this arrangement, the shielding body and cap 33 are adapted for replacing the apertured portion of the shielding body subsequent to withdrawal of the probe 38. This is advantageously effected while maintaining a substantially gastight seal. The shielding body comprises an elongated strip 50 of Teflon, i.e., polytetrafluoroethylene, having a width on the order of 0.3750 inch, for example, and is positioned in a groove 52 extending through a cross section of a cooling fin 53 in the cap 33. Thus, after penetration and withdrawal of the probe 38, the shielding strip 50 is drawn manually through the groove 52 until that segment disposed between the septum body 37 and the chamber is completely shielded. A circular stainless steel disc 54 is disposed intermediate the strip 52 and the body 37 in order to reduce friction therebetween as the strip 52 is advanced in the groove. The operation of the embodiment illustrated in FIGS. 4 and 5 is in other respects similar to that described in the embodiment of FIG. 2.

As indicated hereinbefore, the body 37 has exhibited a tendency to absorb near its inner surface 46 a portion of the sample being injected. The inert shielding body 44 substantially eliminates this characteristic since it exhibits very low affinity for sample materials.

In a sample analysis being separated in a Perkin-Elmer Model 900 gas chromatograph when programmed over a temperature range, and without the benefit of the shielding body of this invention, ghost peaks resulting from septum bleed was detected having significant amplitude. In a same analysis under the same conditions and utilizing the shielding body of FIGS. 1—3 of this application, the ghost peaks were completely eliminated.

Thus, an improved probe sample injection arrangement has been described for use with an analytical instrument. The probe injection arrangement advantageously inhibits contamination by a body formed of a self-sealing material and substantially eliminates retention of portions of the sample being injected by this body.

While we have illustrated and described a particular embodiment of our invention, it will be understood that various modifications may be made therein without departing from the spirit of the invention and the scope of the appended claims.

We claim:

1. In an analytical instrument having an injection station, a probe-penetrable, self-sealing material forming a wall segment of said injection station for introducing a sample by a probe into an injection chamber, means for heating said injection station; said wall material exhausting volatile contaminants when said injection station is heated, a means for reducing the introduction of said contaminants from said wall material into said instrument comprising a demountable shielding body having a disc-shaped configuration disposed between an inner surface of said wall and chamber environment for shielding said inner surface from said environment, said body formed of a material which is probe penetrable and which is nonvolatile at the operating temperature.

2. In an analytical instrument having an injection station, a probe-penetrable, self-sealing material forming a wall segment of said injection station for introducing a sample by a probe into an injection chamber, means for heating said injection station, said wall material exhausting volatile contaminants when said injection station is heated, a means for reducing the introduction of said contaminants from said wall material into said instrument comprising a shielding body having an uninterrupted surface disposed adjacent an inner surface of said wall material for trapping volatile contaminants at an interface between said shielding body and said wall material, said shielding body formed of a material which is probe penetrable and which is nonvolatile at the operating temperature.

3. The apparatus of claim 1 wherein said shielding body is formed of polytetrafluoroethylene.

4. The apparatus of claim 2 including a support means for simultaneously replacing said inert body and maintaining a gastight seal between said wall material and chamber.

5. In an analytical instrument having an injection block, a means for heating the block, an improved probe injection arrangement comprising:
a support means coupled to said block at an injection station thereof and including a support member for supporting a first body having an inner surface thereof and formed of a probe-penetrable, self-sealing material providing a gas seal between an injection chamber environment and atmospheric environment;
said body exhausting volatile contaminants when said injection station is heated;
said support member having a groove formed in a cross section thereof in a direction substantially parallel to the inner surface of said body; and,
a second body formed of a probe-penetrable material which is nonvolatile at the operating temperatures positioned in said groove for shielding said first body from the chamber environment, said second body comprising a segment of an elongated strip having portions thereof extending from said support member whereby said strip is adapted for manual advancement.

6. A probe injection arrangement for a gas chromatograph comprising:
an injection block having a gas flow passage formed therein;
means for heating said injection block;
a tubular member extending from said injection block and communicating with said passage;
a cap mounted at an outer end of said tubular member, said cap including a cylindrical bore and a probe entrance aperture connected with said bore;
a first body formed of a probe-penetrable, self-sealing material positioned in said bore and forming a gas seal said aperture and said bore said body exhausting volatile contamination when heated at the operating temperature; and,
a second body formed of a probe-penetrable material positioned in said bore adjacent said first body for shielding said first body from an environment of said gas passage, said second body comprising a thin disc having an uninterrupted surface and formed of a material which is probe-penetrable and nonvolatile at the operating temperature.

7. The apparatus of claim 6 wherein said cap includes a groove formed in a cross section thereof and said second body is formed of an elongated strip having a portion of said length positioned in said groove.

8. The apparatus of claim 7 including means positioned between said first and second bodies for reducing sliding friction therebetween.